(12) United States Patent
Shah

(10) Patent No.: US 6,889,380 B1
(45) Date of Patent: May 3, 2005

(54) DELAYING LOADING OF HOST-SIDE DRIVERS FOR CLUSTER RESOURCES TO AVOID COMMUNICATION FAILURES

(75) Inventor: Rajesh R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 09/608,632

(22) Filed: Jun. 30, 2000

(51) Int. Cl.$^7$ .............................................. G06F 13/10
(52) U.S. Cl. ........................... 719/327; 710/1; 710/100
(58) Field of Search ........................ 710/1–74, 100–317; 719/321–327; 717/168–178; 707/100–103 R; 714/1–51; 713/1–2

(56) References Cited

U.S. PATENT DOCUMENTS

| | | | | |
|---|---|---|---|---|
| 4,845,609 A | * | 7/1989 | Lighthart et al. | 709/200 |
| 5,819,107 A | * | 10/1998 | Lichtman et al. | 710/8 |
| 5,991,830 A | * | 11/1999 | Beard et al. | 710/18 |
| 6,151,684 A | * | 11/2000 | Alexander et al. | 714/4 |
| 6,256,740 B1 | * | 7/2001 | Muller et al. | 713/201 |
| 6,263,387 B1 | * | 7/2001 | Chrabaszcz | 710/302 |
| 6,499,073 B1 | * | 12/2002 | Wallach et al. | 710/103 |
| 6,529,963 B1 | * | 3/2003 | Fredin et al. | 710/1 |
| 6,578,142 B1 | * | 6/2003 | Anderson et al. | 713/2 |

* cited by examiner

Primary Examiner—Meng-Al T. An
Assistant Examiner—Charles Anya
(74) Attorney, Agent, or Firm—Blakely, Sokoloff, Taylor & Zafman LLP (57) ABSTRACT

A cluster includes hosts, a fabric including switches with forwarding tables, and I/O enclosures. I/O controllers that are within the I/O enclosures are assigned to the hosts by a subnet manager. A fabric control driver within each host determines a list of drivers which correspond to the I/O controllers assigned to the host and that need to be loaded into the host. Before loading the drivers into the host, the fabric control driver sends a verification message for each driver to the I/O enclosure containing the I/O controller that corresponds to the driver. As responses to the verification messages are received, the fabric control driver loads drivers and modifies the list of drivers accordingly.

19 Claims, 9 Drawing Sheets

EXAMPLE SOFTWARE DRIVER STACKS FOR HOST SYSTEM

DELAYING LOADING OF HOST-SIDE DRIVERS FOR CLUSTER RESOURCES TO AVOID COMMUNICATION FAILURES

FIELD

The present invention generally relates to data networks and in particular relates to a method and system for delaying loading of host-side drivers.

BACKGROUND

A data network generally includes a network of nodes connected by point-to-point links. Each physical link may support a number of logical point-to-point channels. Each channel may be a bi-directional communication path for allowing commands and message data to flow between two connected nodes within the data network. Each channel may refer to a single point-to-point connection where message data may be transferred between two endpoints or systems. Data may be transmitted in packets including groups called cells from source to destination often through intermediate nodes.

In many data networks, hardware and software may often be used to support asynchronous data transfers between two memory regions, often on different systems. Each system may correspond to a multi-processor system including one or more processors. Each system may serve as a source (initiator) system which initiates a message data transfer (message send operation) or a target system of a message passing operation (message receive operation). Examples of such a multi-processor system may include host servers providing a variety of applications or services, and I/O units providing storage oriented and network oriented I/O services.

In a data network, drivers may be loaded into hosts to control remote devices. Communication failures can occur when a driver is loaded into a host before a communication channel in the data network is available. As such, there continues to be a need for a solution to the difficulties of successfully loading host-side drivers in data networks.

BRIEF DESCRIPTION OF THE DRAWINGS

A more complete appreciation of example embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein.

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same.

In a network, drivers are often loaded into hosts to control remote devices. Communication failures can occur when a driver is loaded into a host before a communication channel in the network is available. The present invention provides a solution to shortcomings associated with loading host-side drivers in networks.

The present invention is applicable for use with all types of computer networks, I/O hardware adapters and chipsets, including follow-on chip designs which link together end stations such as computers, servers, peripherals, storage devices, and communication devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO), Future I/O (FIO), System I/O and Server Net and those networks including channel-based, switched fabric architecture which may become available as computer technology advances in the Internet age to provide scalable performance. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a method and system by which loading of host-side drivers is delayed to avoid communication failures in a simple data network having several example nodes (e.g., computers, servers and I/O units) interconnected by corresponding links and switches, although the scope of the present invention is not limited thereto.

Figure 1:
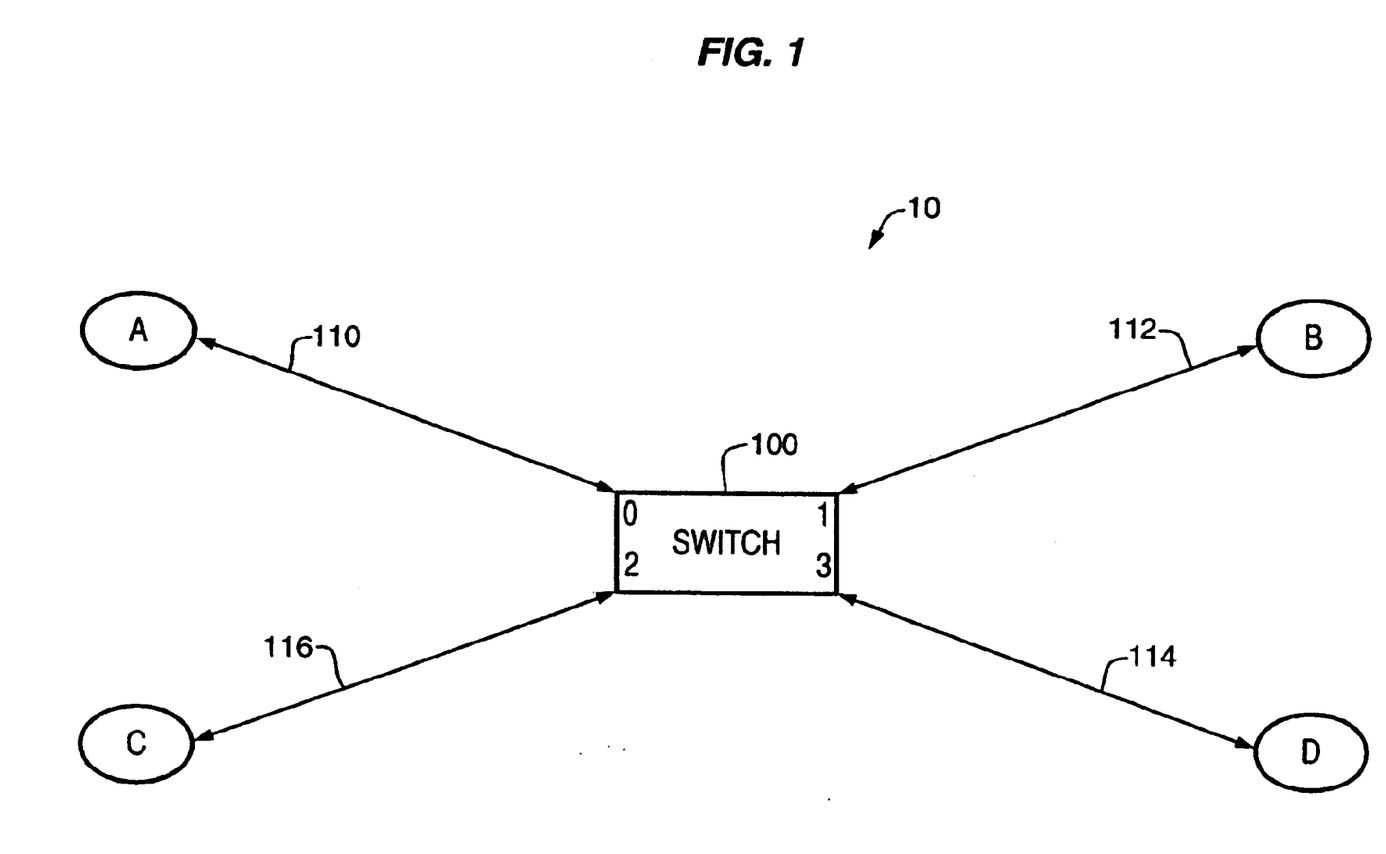
FIG. 1 illustrates a diagram illustrating an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. Each I/O unit may include one or more I/O controllers connected thereto. Each I/O controller may operate to control one or more I/O devices, such as storage devices (e.g., a hard disk drive or tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connect nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the end stations (e.g., host systems and I/O units) of the example data network shown in FIG. 1 may be compatible with the "Next Generation Input/Output (NGIO) Specification" as set forth by the NGIO Forum on Jul. 20, 1999. According to the NGIO Specification, the switch 100 may be an NGIO switched fabric (e.g., collection of links, switches and/or switch elements connecting a number of host systems and I/O units), and the endpoint may be a host system including one or more host channel adapters (HCAs), or a target system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO channel(s).

Figure 2:
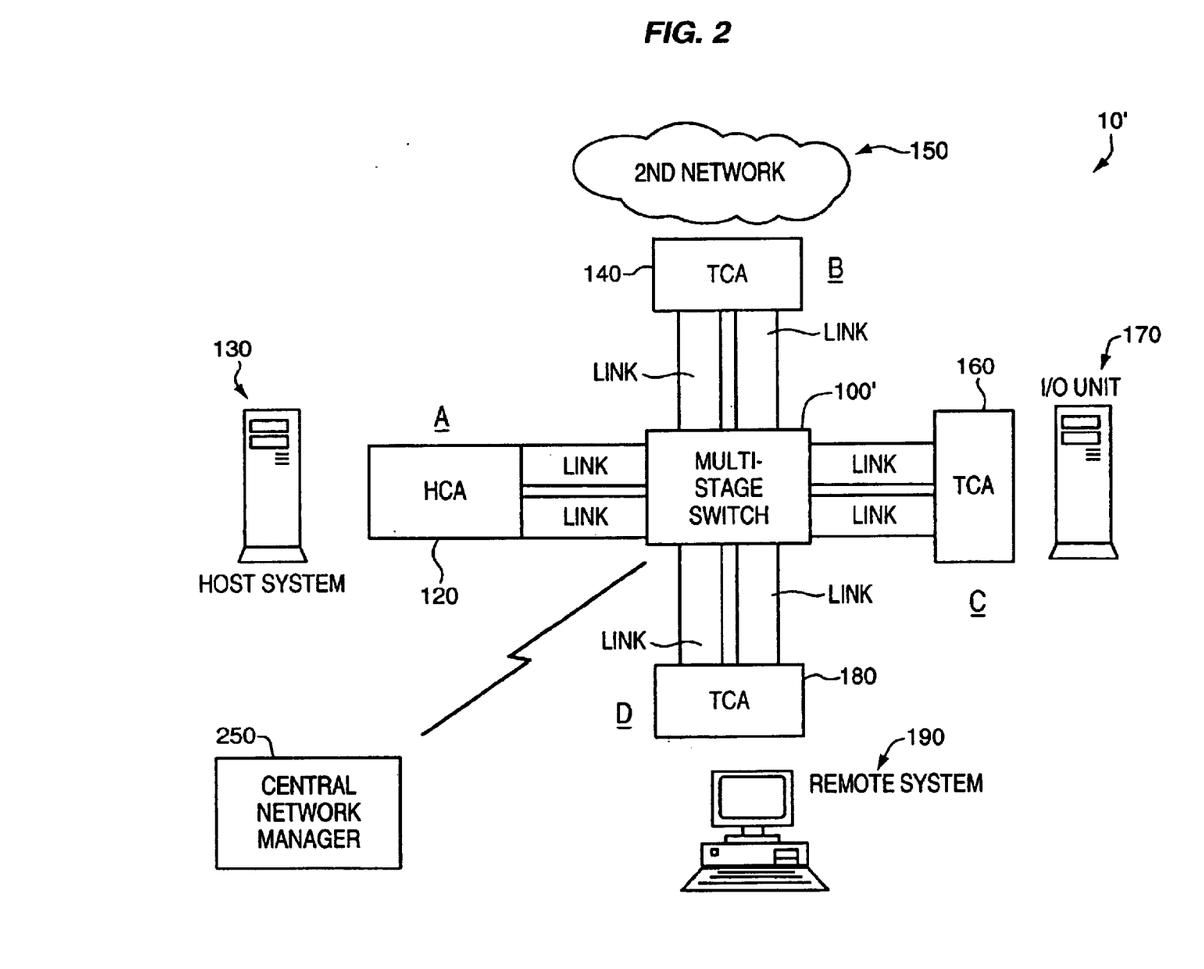
FIG. 2 illustrates another example data network having several nodes interconnected by corresponding links of a multi-stage switched fabric according to an example embodiment of the present invention.

For example, FIG. 2 illustrates an example data network 10' using an NGIO architecture. The data network 10' includes an NGIO fabric 100' (multi-stage switched fabric comprised of a plurality of switches) for allowing a host system and a remote system to communicate to a large number of other host systems and remote systems over one or more designated channels. A single channel may be sufficient but data transfer speed between adjacent ports can decrease latency and increase bandwidth. Therefore, separate channels for separate control flow and data flow may be desired. For example, one channel may be created for sending request and reply messages. A separate channel or set of channels may be created for moving data between the host system and any ones of target systems. In addition, any number of end stations, switches and links may be used for relaying data in groups of cells between the end stations and switches via corresponding NGIO links.

For example, node A may represent a host system 130 such as a host computer or a host server on which a variety of applications or services are provided. Similarly, node B may represent another network 150, including, but not limited to, local area network (LAN), wide area network (WAN), Ethernet, ATM and fiber channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the multi-stage switched fabric 100' which serve as intermediate nodes between the host system 130 and the remote systems 150, 170 and 190.

The multi-state switched fabric 100' may include a central network manager 250 connected to all the switches for managing all network management functions. However, the central network manager 250 may alternatively be incorporated as part of either the host system 190, the second network 150, the I/O unit 170, or the remote system 190 for managing all network management functions. In either situation, the central network manager 250 may be configured for learning network topology, determining the switch table or forwarding database, detecting and managing faults or link failures in the network and performing other network management functions.

A host channel adapter (HCA) 120 may be used to provide an interface between a memory controller (not shown) of the host system 130 and a multi-stage switched fabric 100' via high speed serial NGIO links. Similarly, target channel adapters (TCA) 140 and 160 may be used to provide an interface between the multi-stage switched fabric 100' and an I/O controller of either a second network 150 or an I/O unit 170 via high speed serial NGIO links. Separately, another target channel adapter (TCA) 180 may be used to provide an interface between a memory controller (not shown) of the remote system 190 and the multi-stage switched fabric 100' via high speed serial NGIO links. Both the host channel adapter (HCA) and the target channel adapter (TCA) may be broadly considered as fabric hardware adapters provided to interface either the host system 130 or any one of the target systems 150, 170 and 190 to the switched fabric, and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO channel(s). However, NGIO is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO) and/or InfiniBand technologies. FIO specifications have not yet been released, owing to subsequent agreement of NGIO and FIO factions to combine efforts on InfiniBand. InfiniBand information/specifications are presently under development and will be published in a document entitled "InfiniBand Architecture Specification" by the InfiniBand Trade Association (formed Aug. 27, 1999) having the Internet address of "http://www.InfiniBandta.org".

Figure 3:
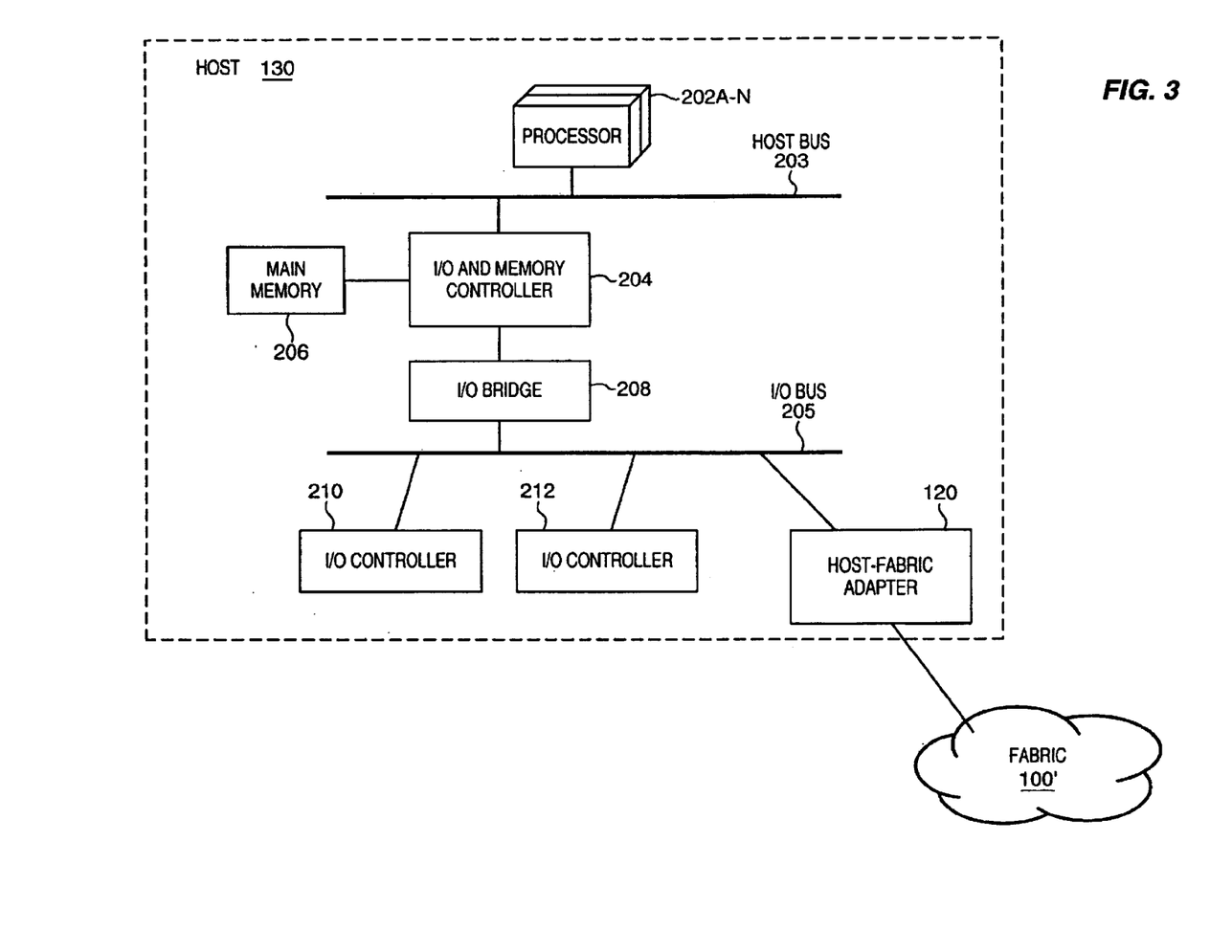
FIG. 3 illustrates a block diagram of a host system of an example data network according to an embodiment of the present invention.

Returning to discussions, one example embodiment of a host system 130 is shown in FIG. 3. Referring to FIG. 3, the host system 130 may correspond to a multi-processor system, including one or more processors 202A–202N coupled to a host bus 203. Each of the multiple processors 202A–202N may operate on a single item (I/O operation), and all of the multiple processors 202A–202N may operate on multiple items (I/O operations) on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to the I/O bus 205, including an I/O controllers 210 and 212. I/O controllers 210 and 212 (including any I/O devices connected thereto) may provide bus-based I/O resources.

Figure 4:
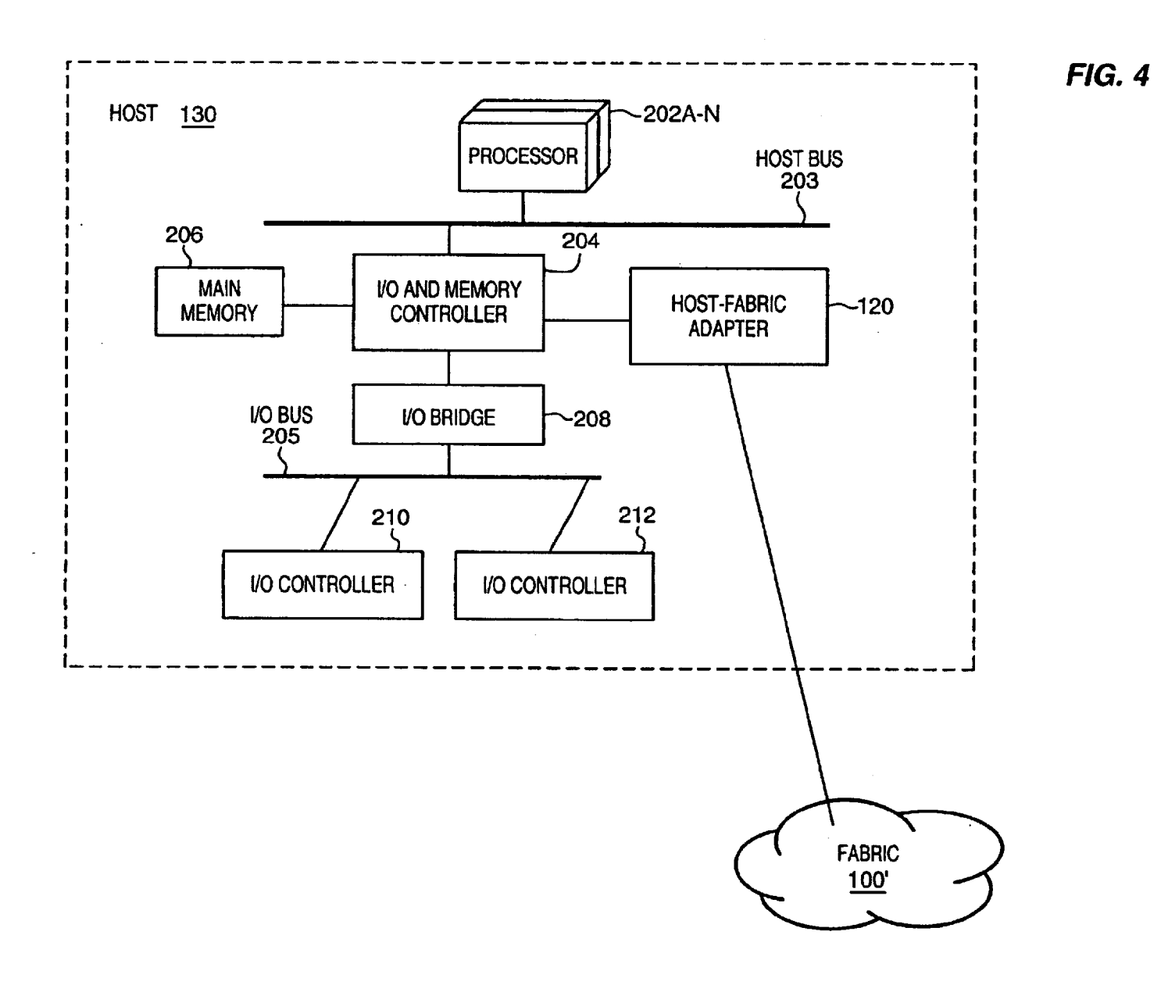
FIG. 4 illustrates a block diagram of a host system of an example data network according to another embodiment of the present invention.

One or more host-fabric adapters 120 may also be connected to the I/O bus 205. Alternatively, as shown in FIG. 4, one or more host-fabric adapters 120 may be connected directly to the I/O and memory controller (or chipset) 204 to avoid the inherent limitations of the I/O bus 205. In either embodiment, one or more host-fabric adapters 120 may be provided to interface the host system 130 to the multi-stage switched fabric 100'.

FIGS. 3–4 merely illustrate example embodiments of a host system 130. A wide array of processor configurations of such a local system 20 may be available. Software driver stack for the host-fabric adapter 120 may also be provided to allow the host system 130 to exchange data with one or more remote systems 150, 170 and 190 via the switched fabric 100', while preferably being compatible with many currently available operating systems, such as Windows 2000.

Figure 5:
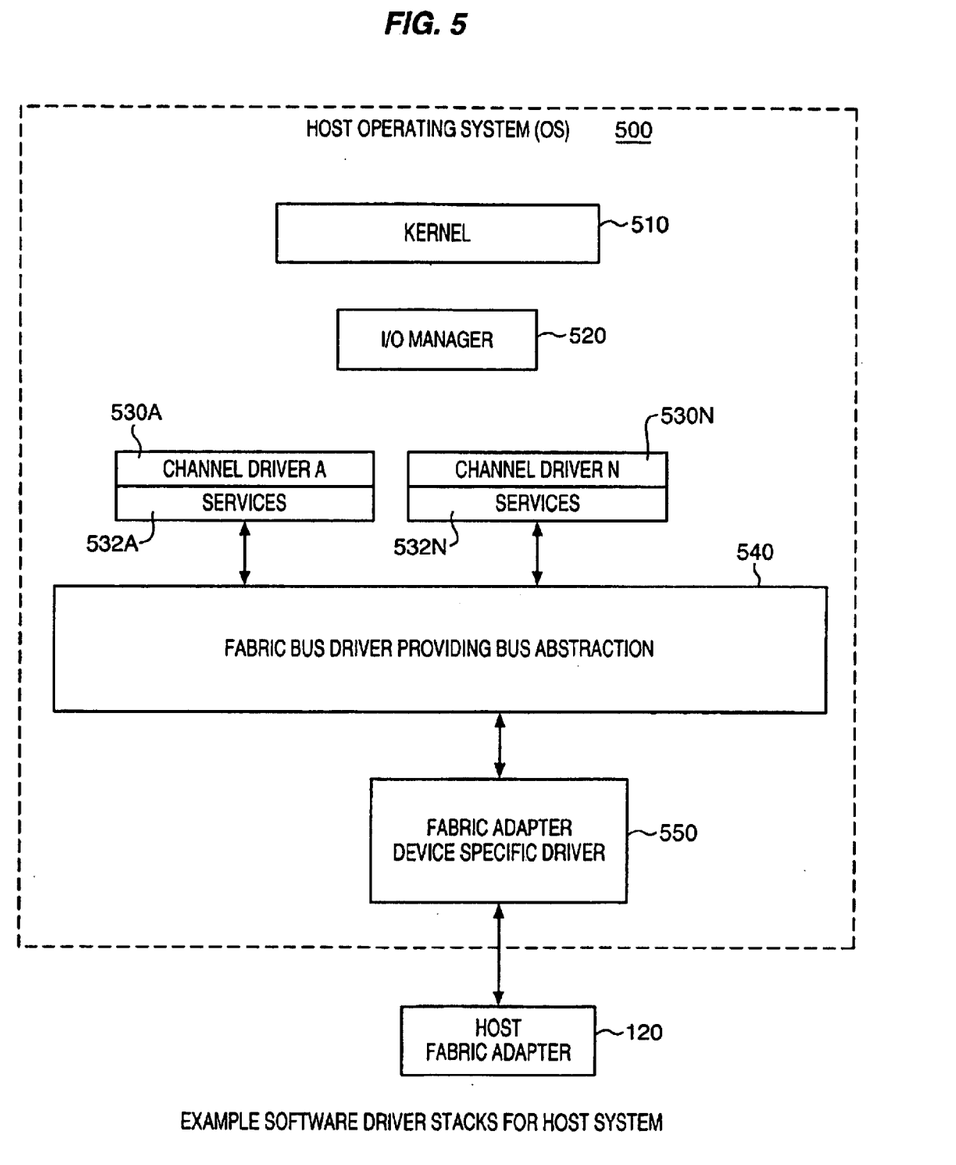
FIG. 5 illustrates an example software driver stack of a host operating system of an example data network according to an embodiment of the present invention.

FIG. 5 illustrates an example software driver stack of a host system 130. As shown in FIG. 5, a host operating system (OS) 500 may include a kernel 510, an I/O manager 520, and a plurality of channel drivers 530A–530N for providing an interface to various I/O controllers. Such a host operating system (OS) 500 may be Windows 2000, for example, and the I/O manager 520 may be a Plug-n-Play manager.

In addition, a host-fabric adapter software stack (driver module) may be provided to access the switched fabric 100' and information about fabric configuration, fabric topology and connection information. Such a host-fabric adapter software stack (driver module) may include a fabric bus driver 540 and a fabric adapter device-specific driver 550 utilized to establish communication with a remote fabric-attached agent (e.g., I/O controller), and perform functions common to most drivers, including, for example, host-fabric adapter initialization and configuration, channel configuration, channel abstraction, resource management, fabric management service and operations, send/receive I/O transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter driver module may consist of three functional layers: a HCA services layer (HSL), a HCA abstraction layer (HCAAL), and a HCA device-specific driver (HDSD) in compliance with the "Next Generation I/O Architecture: Host Channel Adapter Software Specification." For example, the HCA service layer (HSL) may be inherent to all channel drivers 530A–530N for providing a set of common fabric services in a service library, including connection services, resource services, and HCA services required by the channel drivers 530A–530N to instantiate and use NGIO channels for performing data transfers over the NGIO channels. The fabric bus driver 540 may correspond to the HCA abstraction layer (HCAAL) for managing all of the device-specific drivers, controlling shared resources common to all HCAs in a host and resources specific to each HCA in the local system 130, distributing event information to the HSL and controlling access to specific device functions. Likewise, the device-specific driver 550 may correspond to the HCA device-specific driver for providing an abstract interface to all of the initialization, configuration and control interfaces of an HCA.

The host system 130 may also communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "Virtual Interface (VI) Architecture Specification, Version 1.0," as set forth by Compaq Corp., Intel Corp., and Microsoft Corp., on Dec. 16, 1997. NGIO and VI architectures support asynchronous data transfers between two memory regions, typically on different systems over one or more designated channels of a data network. Each system using a VI Architecture may contain work queues formed in pairs including a send queue and a receive queue in which requests, in the form of descriptors, are posted to describe data movement operation and location of data to be moved for processing and/or transportation via a NGIO switched fabric. The VI Specification defines VI mechanisms for low-latency, high-bandwidth message-passing between interconnected nodes connected by multiple logical point-to-point channels. Other architectures such as InfiniBand may also be used to implement the present invention.

In such a data network, NGIO, VI and InfiniBand hardware and software may be used to support asynchronous data transfers between two memory regions, often on different systems. Each system may serve as a source (initiator) system which initiates a message data transfer (message send operation) or a target system of a message passing operation (message receive operation). Each system may correspond to a multi-processor system including multiple processors each capable of processing an I/O completion on a different shared resource (such as work queues or other memory elements associated with a given hardware adapter). Examples of such a multi-processor system may include host servers providing a variety of applications or services, and I/O units providing storage oriented and network oriented I/O services.

A collection of hosts and I/O resources that are connected together by an interconnection fabric is loosely defined as a cluster. The interconnection fabric connecting different hosts and I/O resources may contain zero or more switches. Clusters are typically based on a unifying technology specification that allows hardware and software solutions from different vendors to inter-operate. Examples of such clusters are those based on the NGIO (Next Generation O) technology, FIO technology, and InfiniBand technology. The aforementioned "InfiniBand Architecture Specification" describes features and benefits which are complementary to those provided by NGIO and FIO technologies, and are similarly useful. With regard to InfiniBand technology, a cluster is referred to as a "subnet".

Figure 6:
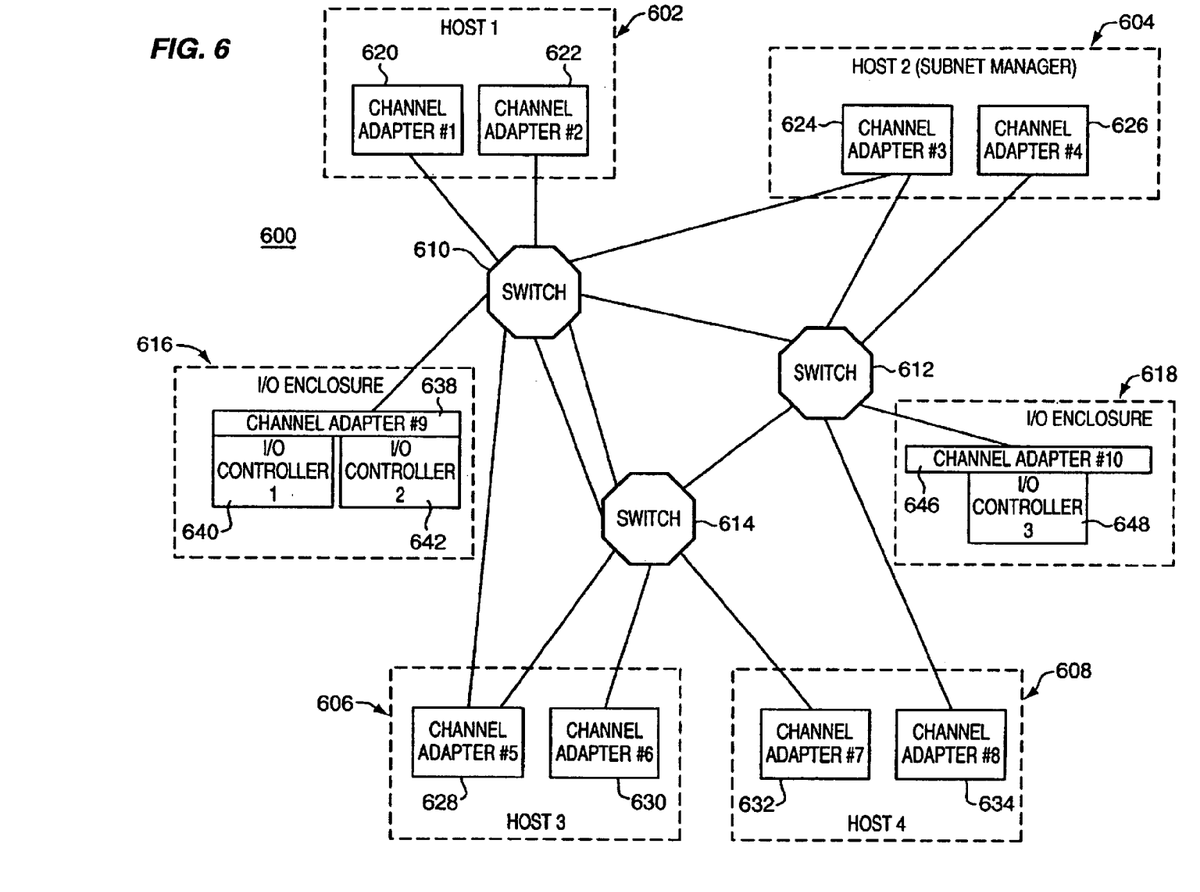
FIG. 6 illustrates an example subnet according to an embodiment of the present invention.

FIG. 6 schematically illustrates an example subnet (or cluster) based on InfiniBand technology. Examples of things specified in the InfiniBand architecture include the link level protocol, common subnet management mechanisms and common characteristics of channel adapters and switches that connect to the cluster. The InfiniBand subnet 600 includes a first host 602, a second host 604, a third host 606, a fourth host 608, a first switch 610, a second switch 612, a third switch 614, a first I/O enclosure 616, and a second I/O enclosure 618. The I/O enclosures contain I/O controllers that in turn have attached devices like hard disks for storage or network interface cards (NICs) for connectivity to external networks.

The first host 602 includes a first channel adapter 620 and a second channel adapter 622. The second host 604 includes a third channel adapter 624 and a fourth channel adapter 626. The third host 606 includes a fifth channel adapter 628 and a sixth channel adapter 630. The fourth host 608 includes a seventh channel adapter 632 and an eighth channel adapter 634.

The first I/O enclosure 616 includes a ninth channel adapter 638, a first I/O controller 640 coupled to the ninth channel adapter 638, and a second I/O controller 642 coupled to the ninth channel adapter 638. The second I/O enclosure 618 includes a tenth channel adapter 646 and a third I/O controller 648 coupled to the tenth channel adapter 646.

Each host or I/O enclosure is connected to the subnet (or cluster) using one or more channel adapters. Each channel adapter contains one or more cluster attachment points called ports. Ports are assigned addresses that are unique within the cluster. I/O controllers in I/O enclosures are assigned to one or more hosts. A host that is assigned a fabric-attached I/O controller will typically load a device driver to manage the I/O controller. Each cluster needs a management entity, referred to as the subnet manager, that administers the cluster devices and interacts with the human system administrator as needed. Examples of functions a subnet manager must perform are detecting arrival and removal of new channel adapters on the fabric, assigning addresses to ports and preparing them for fabric connectivity, and assigning I/O controllers to hosts.

Figure 7:
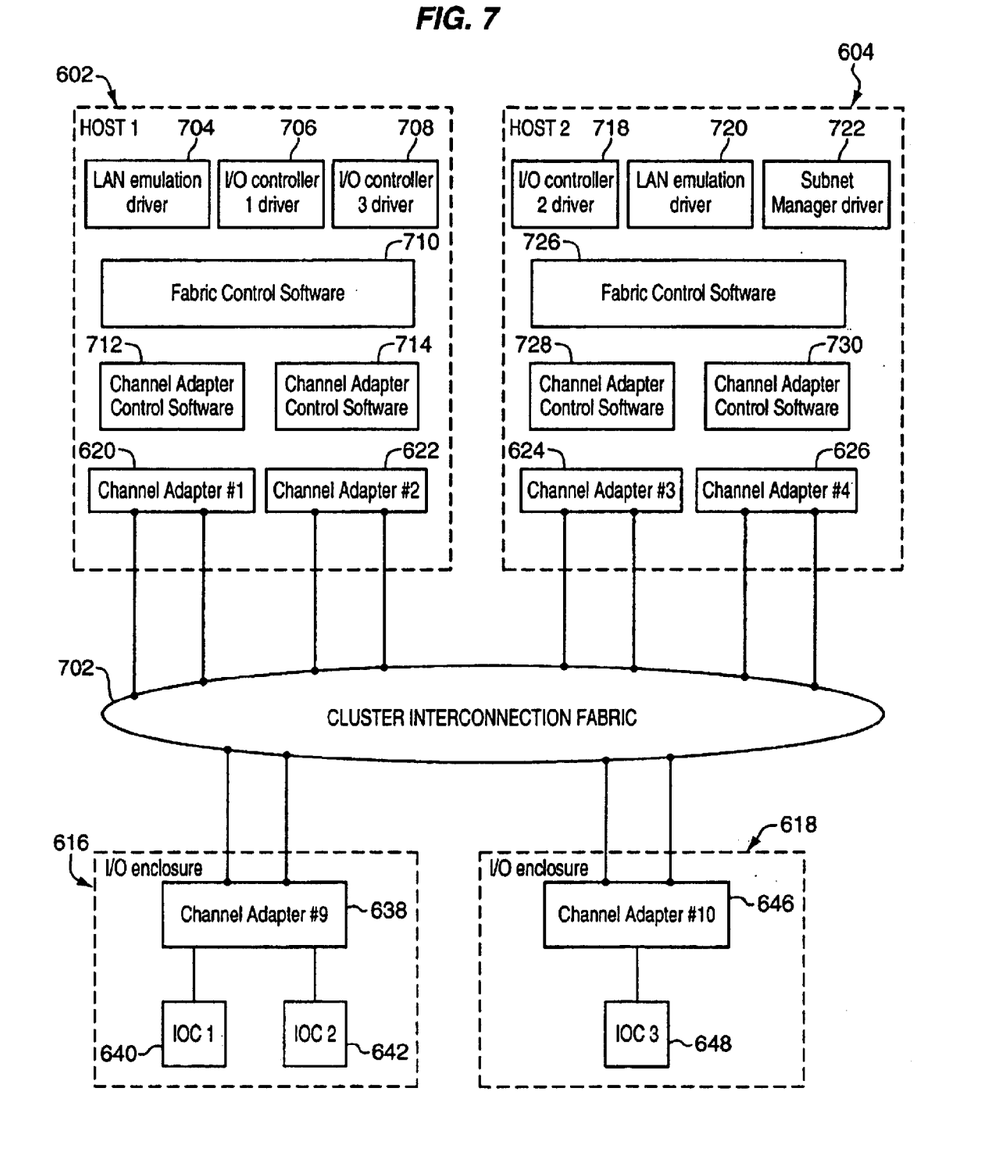
FIG. 7 illustrates software running on hosts in the example subnet depicted in FIG. 6.

With reference to FIG. 6, the second host 604 is the designated subnet manager. FIG. 7 illustrates the software running on the first host 602 and the second host 604 in the example cluster 600 of FIG. 6. For simplicity, the software running on the third host 606 and the fourth host 608 is not shown.

With reference to FIG. 7, the first I/O controller 640 and the third I/O controller 648 are assigned to the first host 602, and the second I/O controller 642 is assigned to the second host 604. The first host 602, the second host 604, the first I/O enclosure 616, and the second I/O enclosure 618 are interconnected via a cluster interconnection fabric 702. The first host 602 includes a LAN emulation driver 704, an I/O controller 1 driver 706, an I/O controller 3 driver 708, fabric control software (i.e., the fabric control driver) 710, the first channel adapter 620, first channel adapter control software 712 for the first channel adapter, the second channel adapter 622, and second channel adapter control software 714 for the second channel adapter.

Referring to FIG. 7, the second host 604 includes an I/O controller 2 driver 718, a LAN emulation driver 720, a subnet manager driver 722, fabric control software (i.e., the fabric control driver) 726, the third channel adapter 624, a third channel adapter control software 728 for the third channel adapter, the fourth channel adapter 626, and a fourth channel adapter control software 730 for the fourth channel adapter.

The first I/O enclosure 616 includes the ninth channel adapter 638, the first I/O controller 640, and the second I/O controller 642. The second I/O enclosure includes the tenth channel adapter 646 and the third I/O controller 648.

The channel adapter control software (712, 714, 728, 730) shown in FIG. 7 interacts with the channel adapter hardware and is specific to the adapter hardware. The fabric control drivers (710, 726) are not specific to adapter hardware and provide uniform access to all types of adapter hardware to clients above it. The fabric control drivers also provide a bus abstraction for the fabric and are responsible for causing the loading of drivers for fabric-attached resources (i.e. I/O controllers). Examples of drivers whose loading is initiated by a fabric control driver are: drivers for fabric-attached I/O controllers and a LAN emulation driver that makes the subnet appear like a local area network.

A basic feature of such a subnet is that all ports on all channel adapters are managed by the subnet manager which, in the example illustrated, is the second host 604. When a new host is plugged into the subnet and powered on, the subnet manager first has to become aware of the presence of the new channel adapter. Once that happens, the subnet manager has to assign each port a unique address, transition the ports through different states and prepare the channel adapter for fabric connectivity by detecting paths to other ports and updating switch forwarding tables.

On a small subnet that is in a stable state, the time this takes can be of the order of seconds or minutes. On a large subnet in which lots of hosts, I/O enclosures and switches are being powered up simultaneously, the time it takes to initialize all ports may be in the order of minutes or tens of minutes. While the subnet manager is setting up the fabric and ports, there is no connectivity to fabric-attached resources and host software cannot use the channel adapter. This means that I/O controller drivers and the LAN emulation driver in the hosts in FIG. 7 cannot communicate with their target during this time.

A mechanism ought to be provided by which the loading of such drivers is delayed till the time that the channel adapter on that host is initialized and active. If this is not done, the drivers that load will immediately attempt to communicate with their fabric-attached resource and fail is because the channel adapter ports are not yet initialized and connected to the fabric. It is not desirable to make every driver for fabric-attached resources wait for some time before it attempts to communicate because there is no good upper bound on the amount of time it should wait. The upper bound will depend on the fabric topology and the specific subnet manager implementation. Each driver has to implement complex code to time-out and retry and some drivers may implement a short time-out and give up too soon.

This invention can be used to delay the loading of host drivers for fabric-attached resources (like I/O controllers) until the host channel adapter is initialized and connected to the subnet. Once the drivers are loaded, they can immediately start communicating with their remote device to initialize it. No changes or special time out code is needed in the drivers for fabric-attached I/O resources.

As part of channel adapter initialization, the subnet manager has to assign a unique address to each connected port, program switch forwarding tables and transition the ports to the ACTIVE state. This is done using mechanisms defined in the architecture specification for the clustering technology being used. For example, the InfiniBand architecture specification specifies Management Datagrams (MADs) that can be used by the subnet manager to assign addresses to ports and transition them to the active state. It also defines MADs that a subnet manager can use to program switch forwarding tables. Whenever a host driver for a fabric-attached resource loads, the host driver attempts to communicate with its remote resource. For this communication to succeed, the channel adapter on the host and target side must both be initialized and the forwarding tables at intervening switches must be correctly programmed. If any of this is not true, the communication will fail. The host-side driver may retry the attempt for a few times before giving up and unloading. Several aspects of the invention are pertinent to solving the aforementioned problems.

First, the channel adapter driver should notify the fabric control driver when the local channel adapter ports are configured and ready for fabric connectivity.

Second, the fabric control driver should not attempt to use a channel adapter to communicate with another fabric-attached host or I/O enclosure till the local channel adapter is ready for fabric communication. This communication may be needed, for example, to query the subnet manager about I/O controllers assigned to this host. This communication may also be needed before a driver for a fabric-attached I/O controller can be loaded by the fabric control driver.

Third, the fabric control driver should not cause the loading of any driver that depends on connectivity to the fabric until it knows that the local channel adapter on this host is initialized and connected to the fabric. In addition, for some host drivers, there is a clearly identifiable set of remote addresses to which this driver will want to communicate. An example of this type of driver is a host-side driver for a fabric-attached I/O controller. For such a driver, the expected target it will need to communicate with is its remote I/O controller. In this case, the fabric control driver does not cause the loading of a driver till it knows that a path exists to the remote I/O controller it will want to communicate with.

Verifying that a path exists implies that the host side as well as the target channel adapter is initialized and that intervening switch forwarding tables are correctly programmed. For InfiniBand clusters, verifying a path can be done by sending the remote target a Get(ClassPortInfo) message and waiting for a response. The Class type specified in the message can be the subnet management class or the device management class to which all I/O enclosures are required to respond. If a response comes back, the fabric control driver knows that the path to the target is initialized and the channel adapters at both ends are initialized. Verifying paths may not be feasible for a host driver for which a clearly identifiable set of remote target addresses does not exist. An example of such a driver is the LAN emulation driver that potentially needs to communicate with every other host on the fabric, including new hosts that are dynamically inserted. In this case, the fabric control driver does not have a clearly identifiable set of targets to which it can validate connectivity before loading the driver. In this case, the fabric control driver simply verifies that the local channel adapter is ready for connectivity and then loads the driver.

There are alternative implementations of the invention. Alternatively, the fabric control driver may choose to implement an algorithm in which it periodically queries the state of the local channel adapter ports to check if the local channel adapter is initialized and connected to the fabric. In this case, the fabric control driver will eventually know when the channel adapter is initialized regardless of whether the channel adapter driver notifies it or not.

Figure 8:
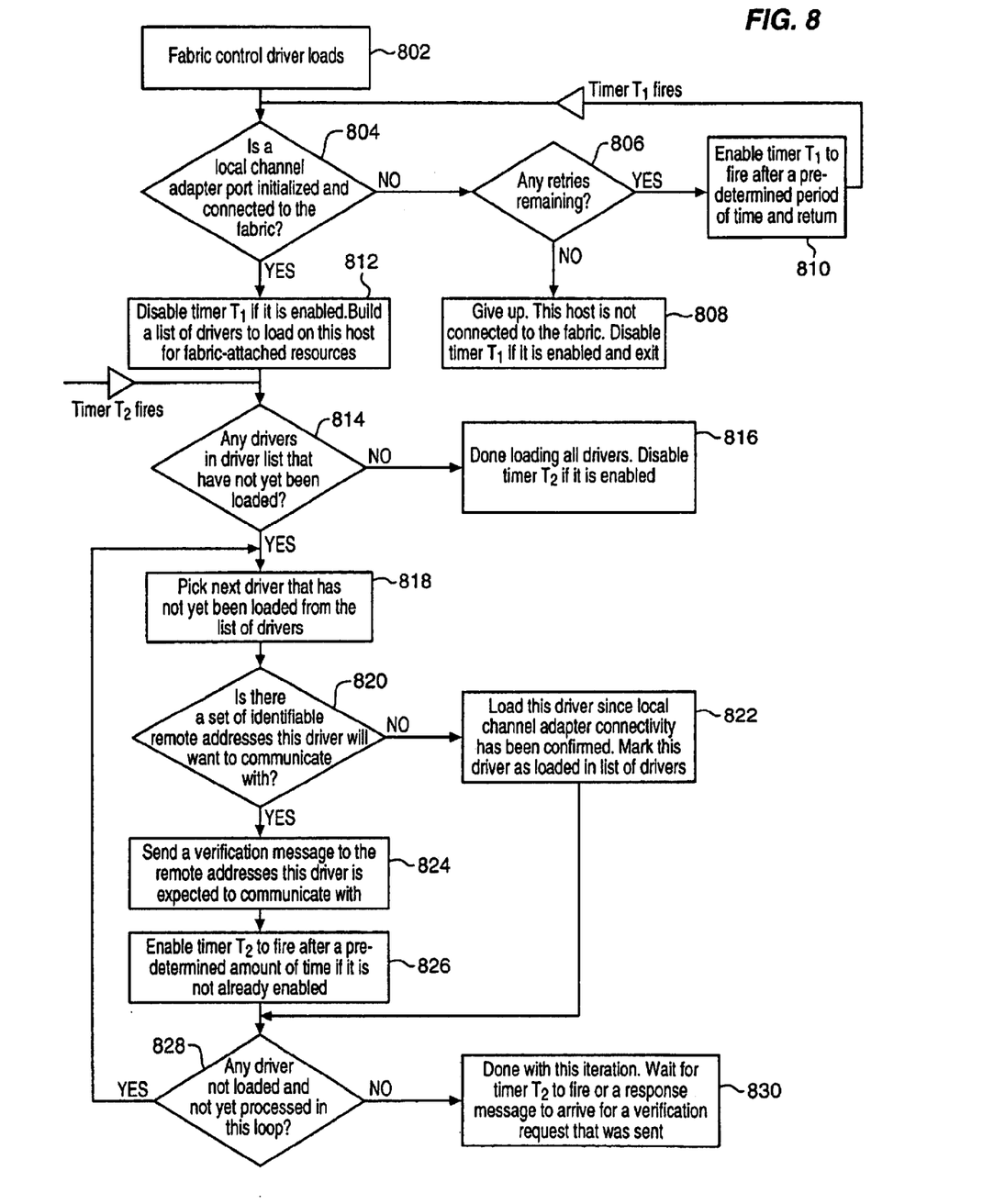
FIG. 8 is a process flow diagram for describing a process to delay loading of drivers according to an embodiment of the present invention.

FIG. 8 is an example process flow diagram illustrating the process implemented by the fabric control driver to delay the loading of drivers. In accordance with the specific embodiment of the invention illustrated in FIG. 8, the fabric control driver first waits to make sure the local channel adapter is initialized and connected to the fabric. The fabric control driver then builds a list of drivers to load. Building the list may be accomplished in a number of ways. A particular implementation may send a message to the subnet manager to request a list of I/O controllers assigned to this host for which drivers should be loaded. Another implementation may scan the fabric looking for I/O controllers for which it should load host side drivers. Yet another implementation may pick up the list of drivers to load from some persistent storage. Of course, a combination of the methods described here could be used.

With reference to the specific embodiment of the invention illustrated by FIG. 8, in block 802, a fabric control driver loads into each host of the subnet. In block 804, each respective fabric control driver determines whether a local channel adapter port in its host is initialized and connected to the fabric. If no, in block 806, the fabric control driver determines whether there are any retries in the process loop remaining. If no, then in block 808 the fabric control driver gives up because this host is not connected to the fabric. In block 808, the fabric control driver disables a timer $T_1$ if it is enabled and exits. If yes, there are retries remaining in the process loop, in block 810, the fabric control driver enables timer $T_1$ to fire after a predetermined period of time and returns to block 804. The fabric control driver makes another determination in block 804, when the timer $T_1$ fires. If it is determined in block 804 that a local channel adapter port is initialized and connected to the fabric, in block 812, the fabric control driver disables timer $T_1$ if it is enabled. The fabric control driver builds a list of drivers to load on this host for fabric-attached resources in block 812.

The firing of a timer $T_2$ serves as an upper loop and is a mechanism by which the list of drivers is modified based on whether any drivers have been loaded since timer $T_2$ last fired. In block 814, the fabric control driver determines whether any drivers in the list of drivers have not yet been loaded. Initially, on the first pass through the process loop, the answer will be yes to all drivers because, in accordance with the principles of the invention, drivers are generally not loaded until after a reply is received from an I/O controller associated with the driver in response to a verification message sent along a communication channel to the I/O controller. If no, in block 816, the fabric control driver is finished loading all drivers. The fabric control driver disables timer $T_2$ if it is enabled. If in block 814, the fabric control driver determines that there are drivers in the list of drivers that have not yet been loaded, in block 818 through block 828, the fabric control driver goes through the list of drivers to determine whether the communication channel to the I/O controller associated with each driver needs to be verified, and if so, verifies the communication channel.

More particularly, in block 818, the fabric control driver picks the next driver that has not yet been loaded from the list of drivers. In block 820, the fabric control driver determines whether there is a set of identifiable remote addresses (i.e., corresponding to a particular fabric-attached device, such as an I/O controller) that this driver will want to communicate with. If no, in block 822, the fabric control driver loads this driver since local channel adapter connectivity has been confirmed. The fabric control driver marks this driver as loaded in the list of drivers, and the example process advances to block 828. If in block 820, the fabric control driver determines that there is a set of identifiable remote addresses that this driver will want to communicate with, in block 824, the fabric control driver sends a verification message to the remote addresses that this driver is expected to communicate with. The verification message requests a response back. For example, the fabric control driver in a host sends the verification message to software running on an I/O enclosure that contains an I/O controller assigned to the host, and for which the driver needs to be loaded into the host. In block 826, the fabric control driver enables timer $T_2$ to fire after a predetermined amount of time if it is not already enabled. Timer $T_2$ fires asynchronously with respect to the process loop of block 818 through block 828. In block 828, the fabric control driver determines whether there is any driver in the list of drivers that is not loaded and not yet processed in this loop. If yes, then the process loop starting with block 818 is executed again. If no, in block 830, the fabric control driver is finished with this iteration. The fabric control driver waits for timer $T_2$ to fire, or for a response message to arrive in response to a verification request that was sent. If there are drivers remaining to be loaded for which a verification request message has been sent but no response has been received, timer $T_2$ will fire after its predetermined interval. When timer $T_2$ fires, execution begins at block 814. At this time, the procedure starting from block 814 is repeated, wherein the list of drivers is modified based on the replies received in response to verification messages previously sent. When a response message arrives, execution starts at the beginning of FIG. 9.

Thus, in accordance with the principles of the invention, regardless of how the fabric control driver builds the list of drivers to load, it does not immediately load all drivers in the list. The fabric control driver goes through the list of drivers and checks to see if the list of remote addresses to which a driver needs connectivity is known. If yes, a verification request is sent (and potentially repeated until a response is received) to the target remote addresses to verify connectivity. The nature of this verification request depends on the architecture specification of the technology being used in the cluster or subnet.

For example, for clusters based on InfiniBand technology (which are called subnets), this request could be a Get (ClassPortInfo) message for the appropriate class type to which I/O enclosures are required to respond. If the list of remote addresses is not known for a driver, it is loaded right away because local channel adapter connectivity has already been established. If the list of remote addresses is known, the algorithm waits until the fabric control driver receives a response message from the remote addresses.

Figure 9:
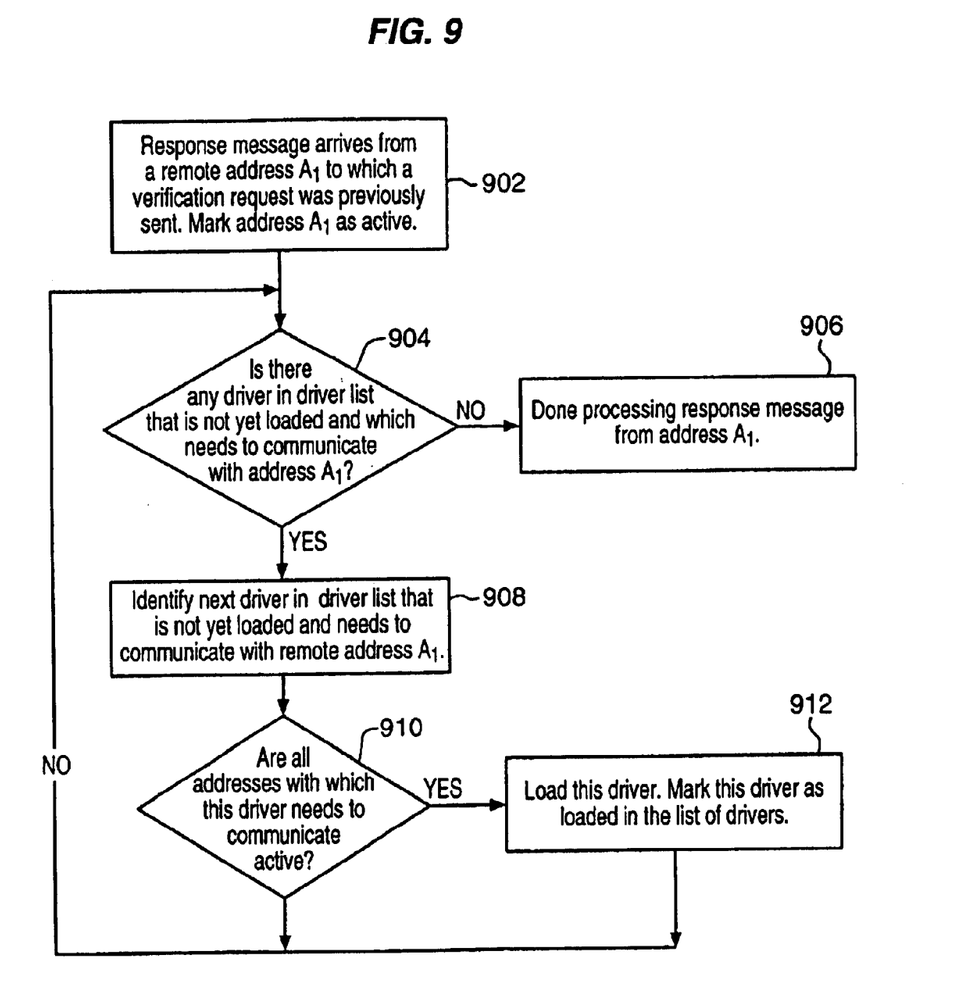
FIG. 9 is a process flow diagram for describing a process performed if a response message arrives according to an embodiment of the invention.

FIG. 9 is an example process flow diagram illustrating the process implemented by the fabric control driver when a response message comes in from a remote address to which a verification request has previously been sent. Receiving a response confirms that the subnet manager has finished initializing the local (host) channel adapter port, the remote channel adapter port as well as forwarding tables in intervening switches. When the driver is loaded, connectivity to its target device is therefore known to exist. Advantageously, this allows the driver for the fabric-attached resource (such as an I/O controller) to start communicating with its remote device immediately without having to wait for the subnet manager to complete its task of initializing the fabric and channel adapter ports.

With reference to the specific embodiment of the invention illustrated by FIG. 9, in block 902, a response message arrives from a remote address $A_1$, such as that of an I/O enclosure containing an I/O controller, and to which a verification request was previously sent. The fabric control driver marks address $A_1$ as active. In block 904, the fabric control driver determines whether there is any driver in the driver list that is not yet loaded and which needs to communicate with address $A_1$. If no, in block 906, the response message from address $A_1$ is considered spurious and the fabric control driver is done processing the response message from address $A_1$. In the process loop of block 904, block 908 and block 910, the fabric control driver is determining which driver or drivers might have a communication channel in existence to a fabric-attached device to which the driver or drivers will need to communicate. If in block 904, the fabric control driver determines that there is a driver in the driver list that is not yet loaded and which needs to communicate with address $A_1$, in block 908, the fabric control driver identifies the next driver in the driver list that is not yet loaded and needs to communicate with remote address $A_1$. In block 908, the fabric control driver is determining the driver (of possibly more than one drivers) for which a verification message was sent and to which this response from address $A_l$ is responsive. In block 910, the fabric control driver determines whether all the addresses with which the identified driver needs to communicate are active. If yes, in block 912, the fabric control driver loads the identified driver. The fabric control driver marks this driver as loaded in the list of drivers. The process loop returns to block 904. If in block 910, the fabric control driver determines that all addresses with which this driver needs to communicate are not active, i.e., there are outstanding responses to verification messages that have not been received, then the process starting with block 904 repeats.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN) and a system area network (SAN). Further, many other modifications may be made to adapt the teachings of the present invention to a particular situation without departing from the scope thereof. Therefore, it is intended that the present invention not be limited to the various example embodiments disclosed, but that the present invention includes all embodiments falling within the scope of the appended claims.

What is claimed is:

1. A method of loading a driver into a host coupled to an interconnection fabric including a fabric-attached I/O enclosure comprising:

assigning a fabric-attached I/O controller that is within said fabric-attached I/O enclosure to the host;

determining the driver to be loaded into the host;

before loading the driver for said fabric-attached I/O controller into the host, sending a verification message to said fabric-attached I/O controller from a fabric control driver of the host via the interconnection fabric to determine whether a communication path exists including determining if a local channel adapter port in the host is initialized and connected from the host to the fabric-attached I/O controller within the fabric-attached I/O enclosure; and if the fabric-attached I/O enclosure responds to the verification message, then loading the driver into the host.

2. The method as claimed in claim 1, further comprising:
alternatively, before loading the driver for the fabric-attached I/O controller into the host, periodically querying the state of a local channel adapter port by the fabric control driver to determining whether a host-fabric adapter in the host has been initialized and connected to the interconnection fabric; and
if the host-fabric adapter in the host has been initialized and connected to the interconnection fabric, then loading the driver into the host.

3. A method of loading a list of plurality of drivers in a plurality of hosts coupled to an interconnection fabric including a plurality of fabric-attached I/O enclosures, comprising:
assigning a plurality of fabric-attached I/O controllers that are within the plurality of fabric-attached I/O enclosures to the plurality of hosts;
determining a list of a plurality of drivers to be loaded into the plurality of hosts, the list of plurality of drivers corresponding to the plurality of fabric-attached I/o controllers;
before loading the list of plurality of drivers into the plurality of hosts, for each of the driver in the list of plurality of drivers, sending a verification message to one of the plurality of fabric-attached I/O controllers that corresponds to the driver in list of plurality of drivers from a fabric control driver to determine if a local channel adapter port in the host is initialized and connected to the interconnection fabric; and
modifying the list of plurality of drivers based on a reply received in response to the verification message.

4. The method as claimed in claim 3, further comprising:
determining the list of plurality of drivers, at least in part, by sending a message to a subnet manager to request the plurality of fabric attached I/O controllers assigned to the plurality of hosts.

5. The method as claimed in claim 3, further comprising:
determining the list of plurality of drivers, at least in part, by scanning the interconnection fabric for the plurality of fabric attached I/O controllers.

6. The method as claimed in claim 3, further comprising:
obtaining the list of plurality of drivers from a storage.

7. The method as claimed in claim 3, wherein:
receipt of the reply confirms that initialization has been completed of the local channel adapter port, a remote channel adapter port, and forwarding tables in intervening switches within the interconnection fabric that will be used in communication between a given one of the plurality of drivers to be loaded and a corresponding one of the plurality of fabric attached I/O controllers.

8. The method as claimed in claim 3, further comprising:
notifying the fabric control driver when local channel adapter ports in a given one of the plurality of hosts is configured and ready for fabric connectivity.

9. A computer readable medium having stored thereon instructions which, when executed by a processor, cause the processor to perform a method for loading a plurality of drivers into a plurality of hosts coupled to an interconnection fabric including a plurality of fabric-attached I/O enclosures, said method comprising:
assigning a plurality of fabric-attached I/O controllers that are within the plurality of fabric-attached I/O enclosures to the plurality of hosts;

determining a list of the plurality of drivers that correspond to the plurality of fabric-attached I/O controllers to be loaded into the plurality of hosts;
before loading any of the plurality of drivers into the plurality of hosts, for each of the plurality of drivers, sending a verification message to a corresponding fabric-attached I/O controller from a fabric control driver of one of the plurality of hosts to determine if a local channel adapter port in one of the plurality of host is initialized and connected to the interconnection fabric; and
modifying the list of plurality of drivers based on a reply received in response to the verification message.

10. The computer readable medium as claimed in claim 9, further comprising:
receiving an interrupt before modifying the list of plurality of drivers.

11. The computer readable medium as claimed in claim 9, further comprising:
determining the list of plurality of drivers, at least in part, by sending a message to a subnet manager to request a list of the plurality of fabric attached I/O controllers assigned to the plurality of hosts.

12. The computer readable medium as claimed in claim 9, further comprising:
determining the list of plurality of drivers, at least in part, by scanning the interconnection a list of fabric attached I/O controllers.

13. The computer readable medium as claimed in claim 9, further comprising:
obtaining the list of plurality of drivers from a storage.

14. The computer readable medium as claimed in claim 9, wherein:
receipt of the reply confirms that initialization has been completed of the local channel adapter port, a remote channel adapter port, and forwarding tables in intervening switches within the interconnection fabric that will be used in communication between a given one of the plurality of drivers to be loaded and a corresponding one of the plurality of fabric attached I/O controllers.

15. The computer readable medium as claimed in claim 9, further comprising:
notifying the fabric control driver when the local channel adapter ports in a given one of the plurality of hosts is configured and ready for fabric connectivity.

16. A network comprising:
an interconnection fabric;
a host comprising an operating system and at least one host-fabric adapter of the host provided to interface with the interconnection fabric;
a fabric-attached I/O enclosure including at least one fabric-attached I/O controller assigned to the host and attached to the interconnection fabric; wherein, for a given host-fabric adapter of the at least one host-fabric adapter, and for a given fabric-attached I/O controller of the at least one fabric-attached I/O controller, the operating system within the host:
determines if the given host-fabric adapter has been initialized and connected for fabric communication by sending verification messages from a fabric control driver of the host to the at least one fabric-attached I/O controller; and
if the given host-fabric adapter has been initialized and connected for fabric communication, loading a driver that corresponds to the given fabric-attached I/O controller assigned to the host, into the host for communication with the at least one fabric-attached I/O controller, via the interconnection fabric.

17. The network as claimed in claim 16, wherein:

the interconnection fabric includes one or more intervening switches having forwarding tables for forwarding data from the host to the at least one fabric-attached I/O controller; and the operating system including the fabric control driver to provide bus abstraction and to result in the loading of the driver for the corresponding at least one fabric-attached I/O controller, including determining whether a communication channel to the at least fabric-attached I/O controller exists before loading into the host the driver that corresponds to the at least one fabric-attached I/O controller.

18. The network as claimed in claim 17, wherein the driver is notified when host-fabric adapter ports are configured and ready for fabric connectivity.

19. The network as claimed in claim 16, wherein the driver sends the verification message to the I/O enclosure via the interconnection fabric.

* * * * *